United States Patent [19]
Yu

[11] Patent Number: 5,572,331
[45] Date of Patent: Nov. 5, 1996

[54] VIDEO SIGNAL RECORDING FORMAT, DEEP RECORDING/REPRODUCING APPARATUS AND METHOD THEREFOR

[75] Inventor: Jae-cheon Yu, Seoul, Rep. of Korea

[73] Assignee: Samsung Electronics Co., Ltd., Kyungki-do, Rep. of Korea

[21] Appl. No.: 158,574

[22] Filed: Nov. 29, 1993

[30] Foreign Application Priority Data

Nov. 27, 1992 [KR] Rep. of Korea ............... 92-22669

[51] Int. Cl.⁶ ..................................... H04N 5/76
[52] U.S. Cl. .......................... 386/46; 360/48; 386/95; 386/115
[58] Field of Search ................... 358/335, 310, 358/341, 343, 342, 328, 340; 360/19.1, 33.1, 48; H04N 5/76

[56] References Cited

U.S. PATENT DOCUMENTS

| | | | |
|---|---|---|---|
| 4,725,896 | 2/1988 | Ohira et al. | 358/328 |
| 4,896,220 | 1/1990 | Sato et al. | 358/328 |
| 5,063,452 | 11/1991 | Higurashi | 360/19.1 |
| 5,260,840 | 11/1993 | Hatanaka et al. | 360/48 |

FOREIGN PATENT DOCUMENTS 2233489  1/1991  United Kingdom.

Primary Examiner—Tommy P. Chin
Assistant Examiner—Khoi Truong
Attorney, Agent, or Firm—Sughrue, Mion, Zinn, Macpeak & Seas

[57] ABSTRACT

A video signal recording format, a deep recording/reproducing apparatus of a video signal and method therefor includes a recording system in which a digital video signal of one frame is divided into a predetermined number of segments and recorded on a surface level of a recording medium using a corresponding number of tracks, and an undivided digital video signal of one frame is recorded in the predetermined number of tracks on a deep level of the recording medium, and a reproducing system in which the digital video signal recorded on the recording medium is reproduced, with the surface-level-recorded data being reproduced during normal speed playback and with the deep-level-recorded data being reproduced during multi-functional playback (high-speed playback). The apparatus and method reduces the overhead of data on the surface level of a recording medium to thereby increase recording efficiency. Further, improved picture quality is provided by utilizing the surface level information as well as the deep level information during high-speed playback.

22 Claims, 13 Drawing Sheets n field  
n+1 field

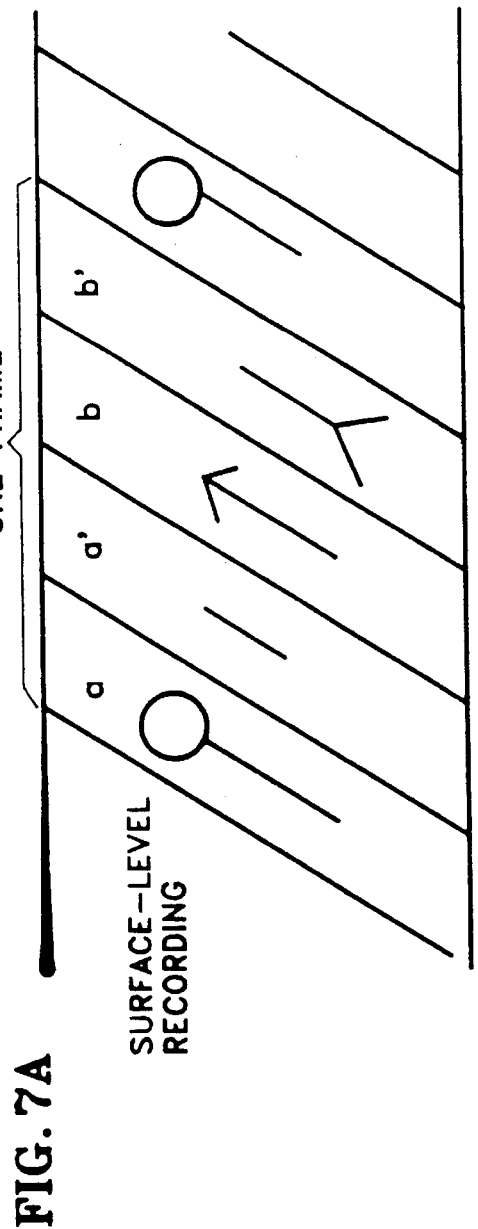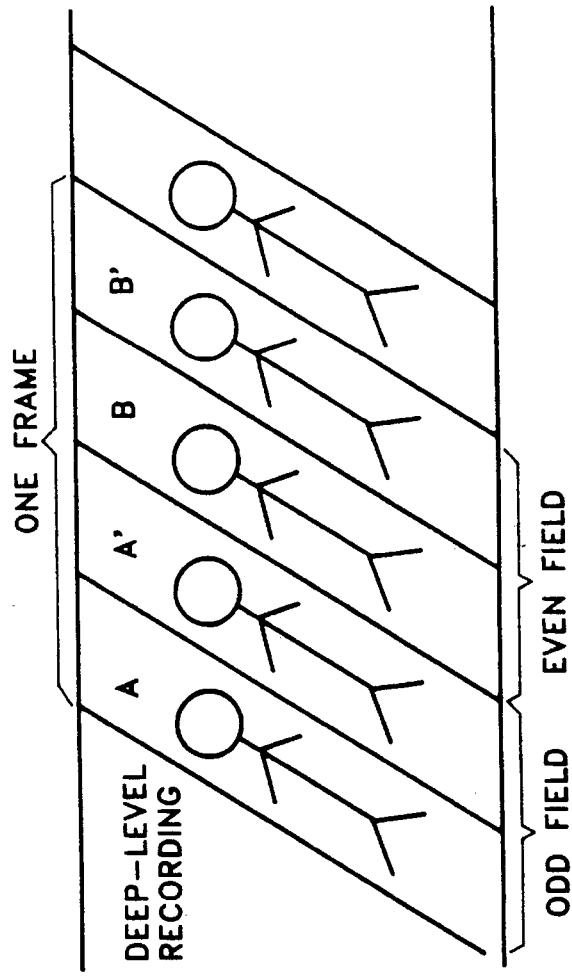

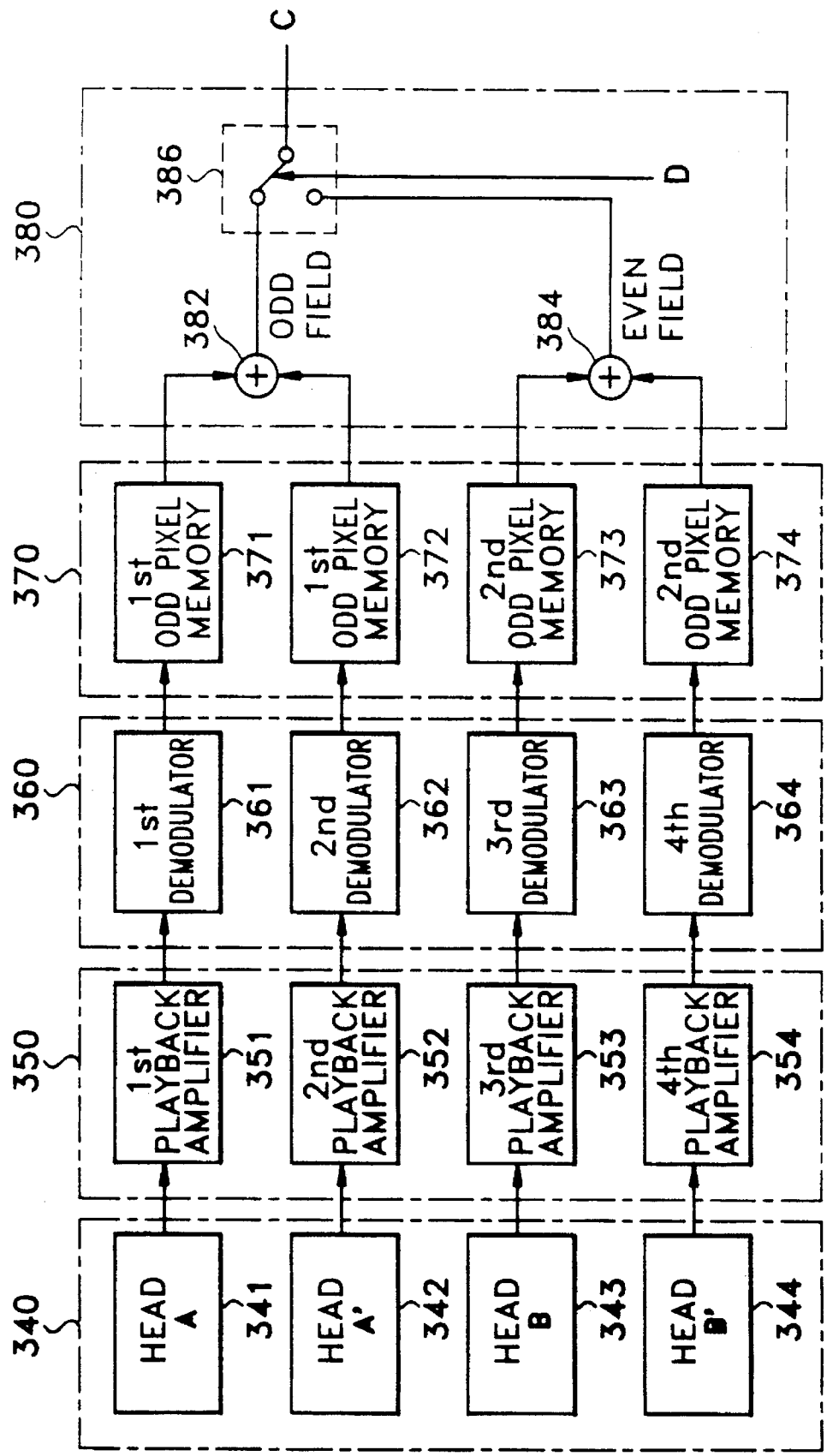

VIDEO SIGNAL RECORDING FORMAT, DEEP RECORDING/REPRODUCING APPARATUS AND METHOD THEREFOR

BACKGROUND OF THE INVENTION

The present invention relates to a deep recording/reproducing apparatus and video signal recording format and method therefor, in which a video signal is recorded on a deep level of a recording medium in units of screens in addition to a signal recorded on the surface level thereof, and in which the deeply recorded signal is reproducible during multifunctional operations.

In a general analog video cassette recorder (hereinafter referred to as a VCR), in recording one screen (one frame) of a video signal on a recording medium such as tape, a dual-channel video track is used. A first field (the odd field) of the video signal is recorded on one channel of the video track, and a second field (the even field) thereof is recorded on the other channel.

In such a VCR, a multifunctional operation (i.e., fast forward, rewind, high-speed search, etc.) creates noise due to the fact that a head reproduces while crossing tracks. Because of this problem, a double-azimuth four head configuration has been employed in such analog VCRs so that a picture without noise is obtained even during such multifunctional operation.

Meanwhile, to satisfy the increasing demand for recording and reproducing a high-quality picture, a digital VCR (D-VCR) has been presented along with high-definition television.

In such D-VCRs, to precisely record and reproduce video information, velocity control is required. For this, a drum servo and capstan servo are provided as in FIG. 1. The function of the drum servo is such that when a video head attached to a drum tracks tape, the video head is rotated at a predetermined velocity and phase. The capstan servo functions so as to move the tape at a predetermined velocity and phase. As illustrated in FIG. 2A, the relative velocity of the drum is vector-synthesized with the drum velocity and capstan velocity.

During normal-speed playback, as shown in FIG. 2B, tracks are traced along the same head track as used during recording.

In a VHS VCR, high-speed playback is performed in addition to normal-speed playback. In this case due to the increase of capstan motor speed, the tracks cannot be traced along the same head track as used during recording, as shown in FIG. 2C. However, in an analog VCR having double-azimuth four heads, since the correlation between fields is high as shown in FIG. 3A, even during high-speed playback, image synthesis is facilitated and a high-speed-reproduced picture is obtained without difficulty as shown in FIG. 3B.

However, a digital VCR experiences problems during high-speed playback due to the following reasons.

First, in digital VCRs, when analog information is converted into digital form, the amount of information is increased so that one frame of information is stored onto four fields (tracks), and the correlation between fields is very low. This is because the video source is shuffled so as to eliminate burst errors due to inherent tape defects. When the shuffling is performed, the burst errors become random errors which have an error dispersion effect greater than the burst errors, to improve picture quality. In this shuffling, however, the correlation between fields is greatly lowered to thereby hinder image reconstruction.

Secondly, since the digitized signal is recorded by data compression, when data expansion is performed during high-speed playback, the high-speed playback should be carried out in sync units so as to restore the data. Here, image reconstruction is achieved according to location information. If the high-speed playback is not performed in sync units, data expansion is impossible due to the incomplete reading of data.

Meanwhile, the digital VCR uses four video tracks (segments) when one frame of video signals is recorded on tape. A digital signal is error-corrected according to an error correction code (ECC). However, if an error which cannot be error-corrected by the ECC is created, since the error adversely affects picture quality, one frame of the digital video signal is divided into segments and recorded on four video tracks, thereby preventing error-generated noise.

A video signal recording/reproducing apparatus having a variable playback velocity in which, during the recording of a video signal according to a segment method, each segment is recorded on different video tracks, is disclosed in U.S. Pat. No. 4,887,169.

In the above disclosure, a segment index signal is inserted and recorded during the horizontal blanking period of each segment. The index signal is detected from a reproduced signal only during high-speed playback, not during normal-speed playback so that sequentially reproduced signals according to the index signal are temporarily stored in a memory and are output according to the control signal of a controller. Since the apparatus requires the index signal for high-speed playback, however, increased overhead of data (parity data) occurs.

Further, a method has been proposed in which one screen of a digital video signal is additionally recorded on an expected traveling track of a head during multifunctional operation so as to enable a high-speed search. However, this method involves technical difficulties in that the traveling track must be precisely predicted. The method also exhibits a limited enhancement of picture quality and complicated hardware.

Furthermore, a VHS hi-fi method is well-known in which an audio FM signal is recorded on a deep level of the magnetic substance of a tape and a video signal is recorded on a surface level thereof. In this method, first, signals are recorded on the deep level using a strong magnetic field, and then signals are recorded on the surface portion using a weak magnetic field. Such a hi-fi VCR is disclosed in U.S. Pat. No. 4,757,394.

SUMMARY OF THE INVENTION

Therefore, it is an object of the present invention to provide a video signal recording format, in which a video signal is recorded on the deep level of a recording medium in units of screens in addition to a video signal recorded on the surface thereof in segment format, with each screen being divided into segments.

It is another object of the present invention to provide a video signal recording/reproducing apparatus and method therefor, in which a video signal is recorded on the deep level of a recording medium in units of screens in addition to a video signal recorded on the surface thereof in segment format, with each screen being divided into segments, so as to reproduce the video signal during multifunctional operations.

To accomplish the first object, there is provided a video signal recording format wherein an input digital video signal of one frame is divided into a predetermined number of segments and recorded on the surface level of a recording medium with each segment being recorded into its own track, and an undivided digital video signal of one frame is recorded in the same predetermined number of tracks on the deep level of the recording medium.

To accomplish the second object, there is provided a deep recording/reproducing apparatus of a video signal comprising: a recording system in which an input digital video signal of one frame is divided into a predetermined number of segments and recorded on the surface level of a recording medium with each segment being recorded into its own track, and an undivided digital video signal of one frame is recorded in the same predetermined number of tracks on the deep level of the recording medium; and a reproducing system in which the digital video signal recorded on the recording medium by the recording system is reproduced, with the surface-level-recorded data being reproduced during normal speed playback and with the deep-level-recorded data being reproduced during high-speed playback.

To also accomplish the second object, there is provided a deep recording/reproducing method comprising the steps of: dividing one frame of input digital video signal into a predetermined number of segments so as to record the divided signal on the surface level of a recording medium with each segment being recorded into its own track, and recording one frame of an undivided digital video signal on the deep level of the recording medium in the same predetermined number of tracks; and reproducing the digital video signal recorded on the recording medium during the recording step, with the surface-level-recorded data being reproduced during normal playback and with the deep-level-recorded data being reproduced during multifunctional playback.

BRIEF DESCRIPTION OF THE DRAWINGS

The above objects and other advantages of the present invention will become more apparent by describing in detail a preferred embodiment thereof with reference to the attached drawings in which:

FIG. 7A is a diagram of a surface-recorded recording medium;

FIG. 7B is a diagram of a deep-recorded recording medium;

FIGS. 9A and 9B are block diagrams of one embodiment of the deep reproducing apparatus of a video signal of the present invention;

DETAILED DESCRIPTION OF THE PREFERRED EMBODIMENTS OF THE INVENTION

Figure 1:
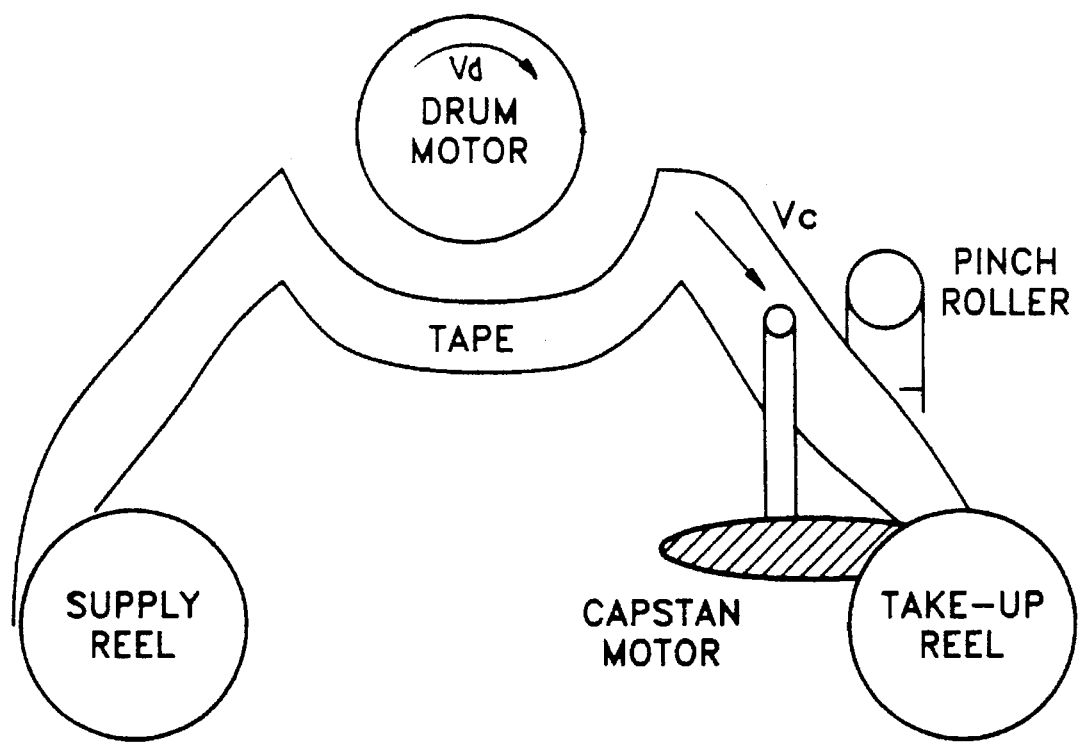
FIG. 1 is a diagram to illustrate the mechanism of a digital VCR.
Figure 2A:
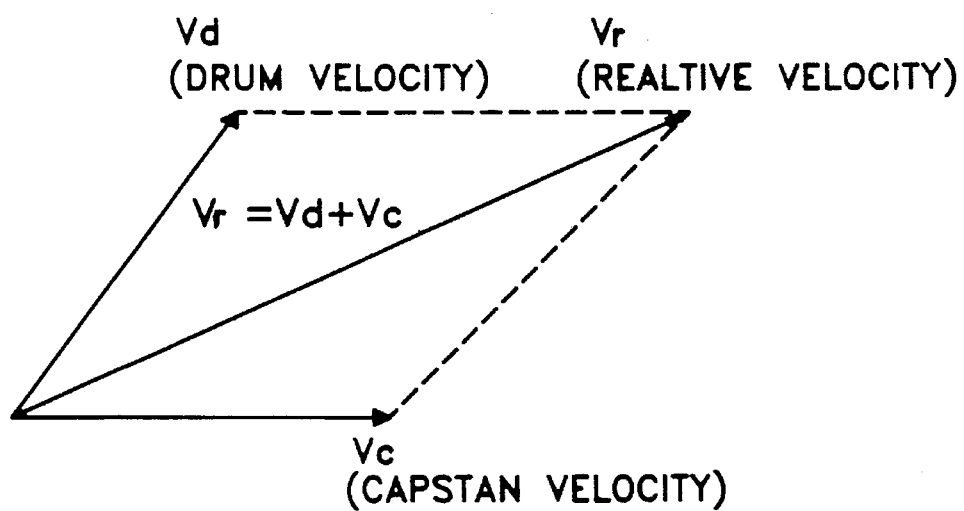
FIG. 2A is a diagram to explain the relative velocity of a head.
Figures 2B, 2C:
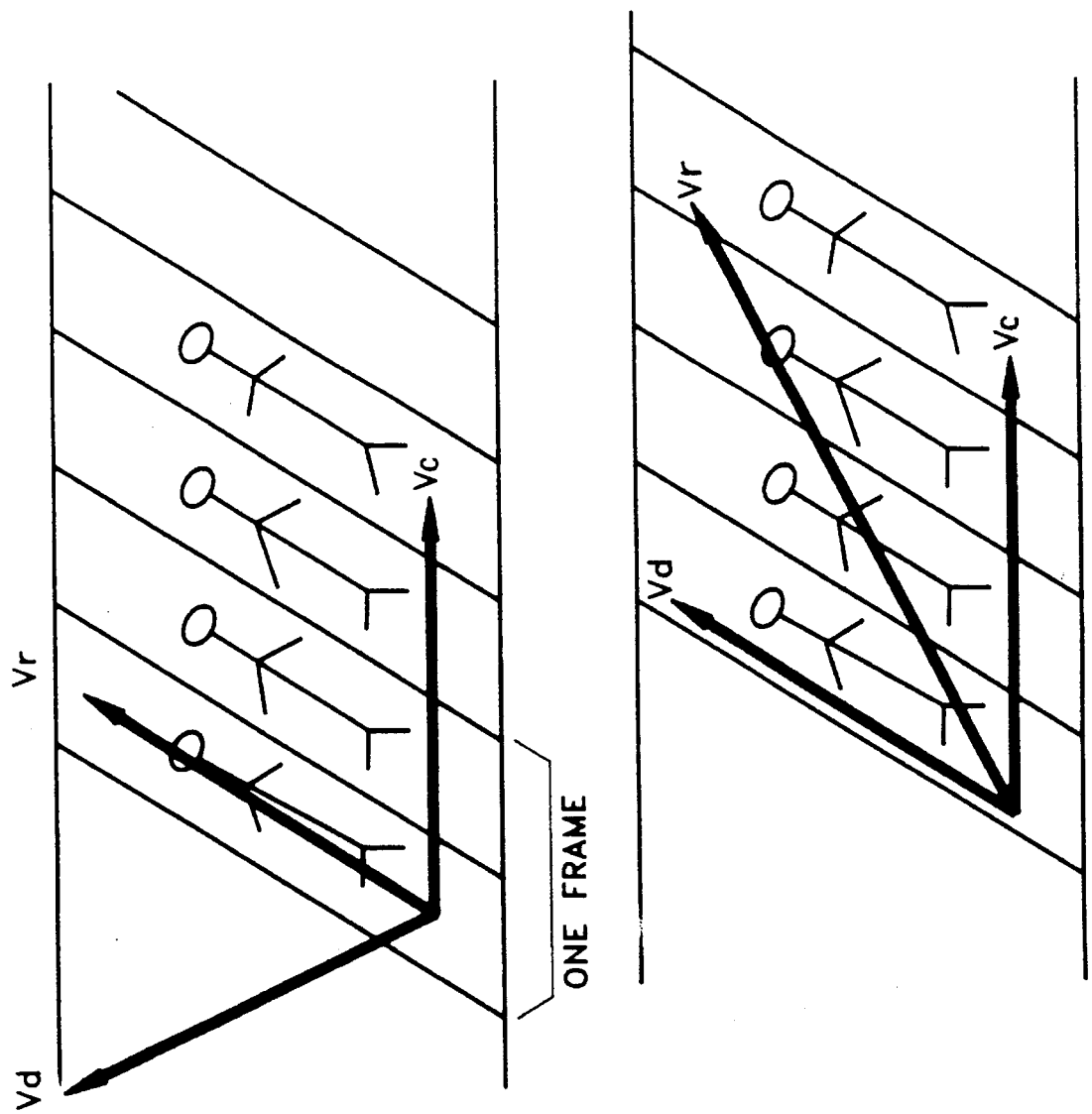
FIG. 2B is a diagram to illustrate the track of a head during normal-speed playback.
FIG. 2C is a diagram to illustrate the track of a head during high-speed playback.
Figure 3A:
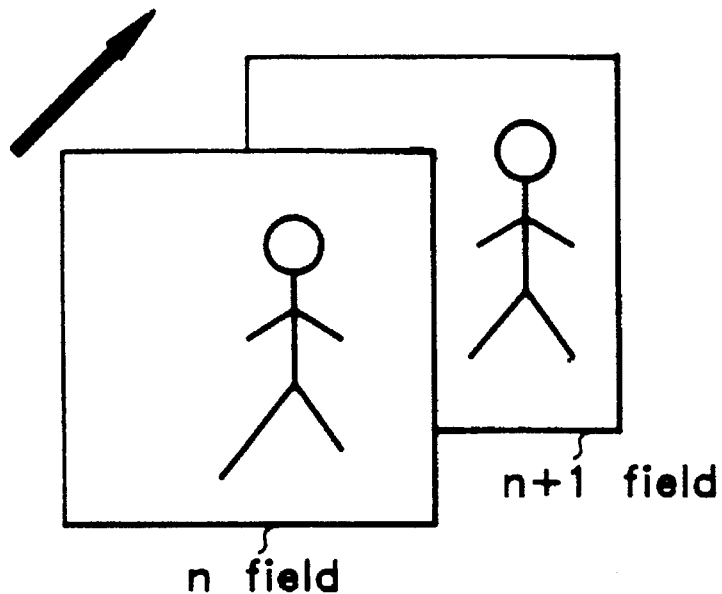
FIG. 3A illustrates a picture state during normal-speed playback.
Figure 3B:
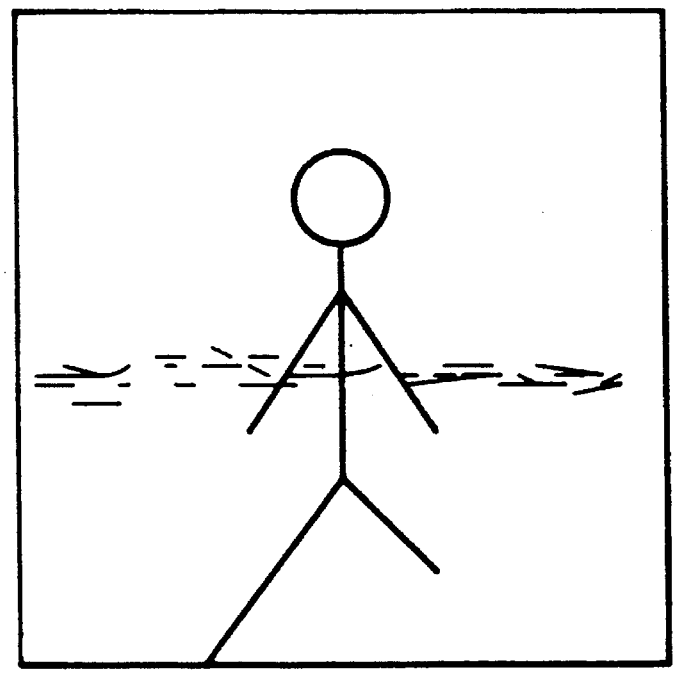
FIG. 3B illustrates a picture state during high-speed playback.
Figure 4A:
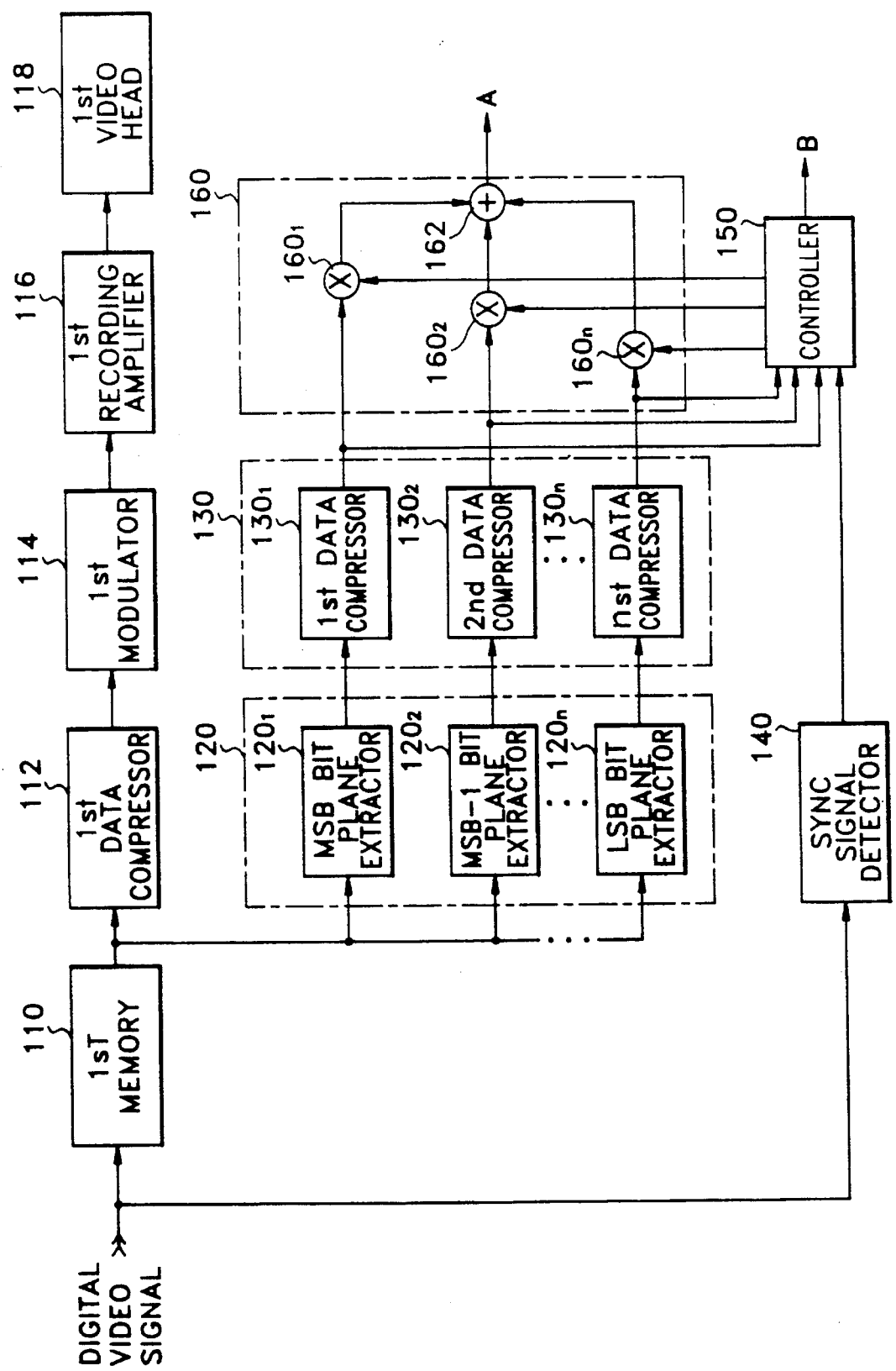
FIGS. 4A and 4B are block diagrams of one embodiment of a deep recording apparatus of a video signal of the present invention.
Figure 4B:
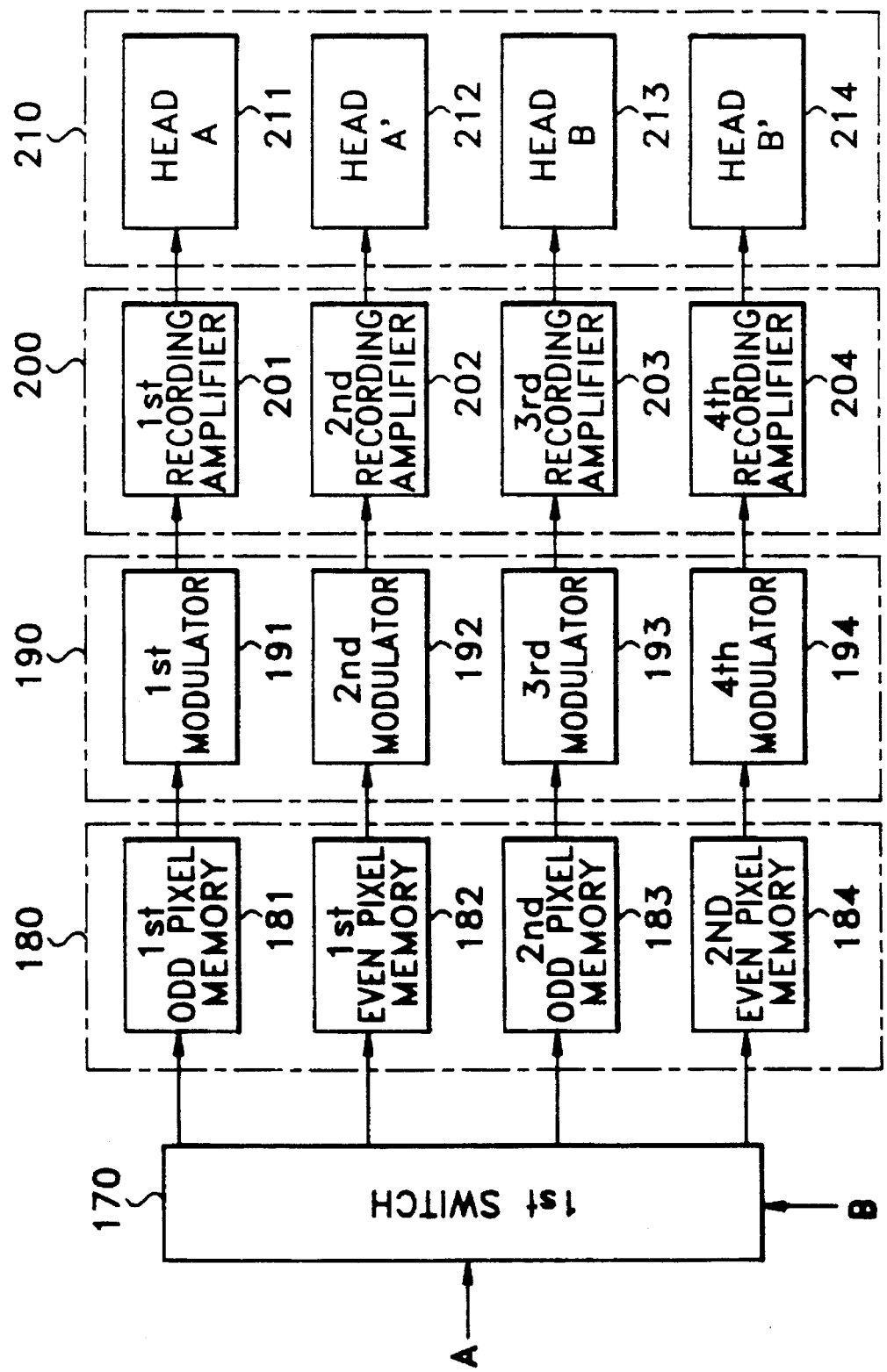

Referring to FIGS. 4A and 4B, one embodiment of the deep recording apparatus of the present invention has: a first memory 110 for temporarily storing an input video signal; a first data compressor 112 for compressing the digital video signal output from first memory 110; a first modulator 114 for modulating the digital video signal output from first data compressor 112; a first recording amplifier 116 for amplifying the digital video signal modulated by first modulator 114; a first video head assembly 118 for recording the digital video signal output from first recording amplifier 116 on the surface level of a recording medium such as magnetic tape; a bit plane extractor 120 for extracting the digital video signal output from first memory 110 in units of bit planes of MSB, MSB−1 ..., LSB; a second data compressor 130 for compressing the bit-plane-extracted data from bit plane extractor 120; a sync signal detector 140 for detecting a sync signal from the digital video signal; a controller 150 for outputting a signal for selecting data output from second data compressor 130, and for determining whether the present field is odd or even so as to output a field control signal B (odd/even); a bit rate controller 160 composed of first through nth multipliers $160_1, 160_2 \ldots, 160_n$ for selectively outputting the data from second data compressor 130 according to a control signal from controller 150, an adder for adding the output data of the first through nth multipliers $160_1$–$160_n$; a first switch 170 switched by the field control signal B output from controller 150 for classifying data into odd pixels and even pixels of an odd field and into odd pixels and even pixels of an even field, and outputting the classified data; a second memory 180 for temporarily storing data output from first switch 170; a second modulator 190 for modulating data output from second memory 180 to a quadrature-phase-shift-keyed (QPSK) signal; a second recording amplifier 200 for amplifying the data modulated by second modulator 190 to a signal level for recording the data on the deep level of a recording medium; and a second video head assembly 210 for recording the output signal amplified by second recording amplifier 200 on the deep level of the recording medium.

Now, the operation of the deep recording apparatus shown in FIGS. 4A and 4B will be described below.

First memory 110 stores an input digital video signal in units of screens (frames). First data compressor 112 compresses the data stored in first memory 110, using a discrete cosine transform (DCT) function and variable length coding (VLC) which have been proposed by the MPEG. First modulator 114 modulates the data (eight bits) output from first data compressor 112 into a predetermined number of bits (for instance, fourteen) so as to enhance transmission efficiency. First recording amplifier 116 amplifies the modulated data which are in turn surface-recorded by first video head assembly 118.

Here, first memory 110, first data compressor 112, first modulator 114, first write amplifier 116 and first video head assembly 118 are all well-known in D-VCR technology.

Hereinafter, the data process for deep recording will be described.

First through nth extractors $120_1$–$120_n$ of bit plane extractor 120 extract the digital video signal output from first memory 110 in units of MSB, MSB–1 . . . , LSB bit planes. First through nth compressors $130_1$–$130_n$ of second data compressor 130 compress the extracted data by the DCT and VLC methods in units of bit planes. Here, if the data is expressed in eight bits, n equals eight.

Sync signal detector 140 detects a sync signal from the input digital video signal and outputs it to controller 150. Controller 150 calculates the bit rate of the data compressed by second data compressor 130 and outputs a control signal to bit rate controller 160 so as to select a bit plane within the maximum recording bit rate within which a signal can be recorded on a recording medium. The controller 150 also determines whether the present field is odd or even according to the sync signal detected from sync signal detector 140 so as to output a field control signal B (odd/even).

First through nth multipliers $160_1$–$160_n$ turn on or off the data output from second data compressor 130 according to the control signals (logic "0" or "1") output from controller 150, so as to selectively output the data. For instance, according to the data compressing result of second data compressor 130, when a picture is simple (a simpler picture corresponds to a higher compression rate), multiple outputs among first through nth compressors $130_1$–$130_n$ are selected within the predetermined maximum recording bit rate. When the picture is complicated (a more complicated picture means corresponds to a lower compression rate), fewer outputs of first through nth compressors $130_1$–$130_n$ are selected within the predetermined maximum recording bit rate.

Adder 162 adds the data selectively output from first through nth multipliers $130_1$–$130_n$ according to the control signals of controller 150. First switch 170 is switched by the field control signal B from controller 150, so as to classify the output of adder 162 into odd pixels and even pixels of an odd field and into odd pixels and even pixels of an even field.

Second memory 180 consists of first odd pixel memory 181 and first even pixel memory 182 of an odd field and second odd pixel memory 183 and second even pixel memory 184 of an even field, and temporarily stores and outputs the pixel data output from first switch 170.

First to fourth modulators 191–194 of second modulator 190 QPSK-modulate the data output from second memory 180. First to fourth amplifiers 201–204 of second recording amplifier 200 amplify the modulated data to a signal level at which data can be recorded on a recording medium. Second video head assembly 210 records the output signal amplified by second recording amplifier 200 on the deep level of a tape.

Here, second video head assembly 210 is comprised of head A for recording odd pixel data of an odd field, head A' for recording even pixel data thereof, head B for recording odd pixel data of an even field, and head B' for recording even pixel data thereof.

Figure 5:
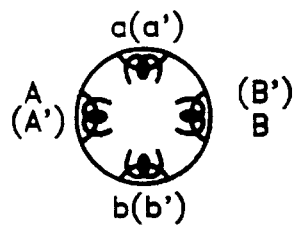
FIG. 5 is a diagram to illustrate the positioning of a deep-recording head and surface-recording head on a drum.

FIG. 5 illustrates the location of first video head 118 and second video head 210 on a drum. First video head assembly 118 is comprised of heads a, a', b, and b' and is a conventional video head assembly. Head A of second head assembly 210 is placed so as to have 180 degrees of phase difference with respect to head B on a drum. Head A' is placed a predetermined distance from head A. Head B' is placed so as to have 180 degrees of phase difference with respect to head A'. Here, as the second video head assembly 210, four heads are used, but, in accomplishing the purpose of the present invention, two general heads may be used to record a signal by dividing it into odd and even fields.

Figure 6:
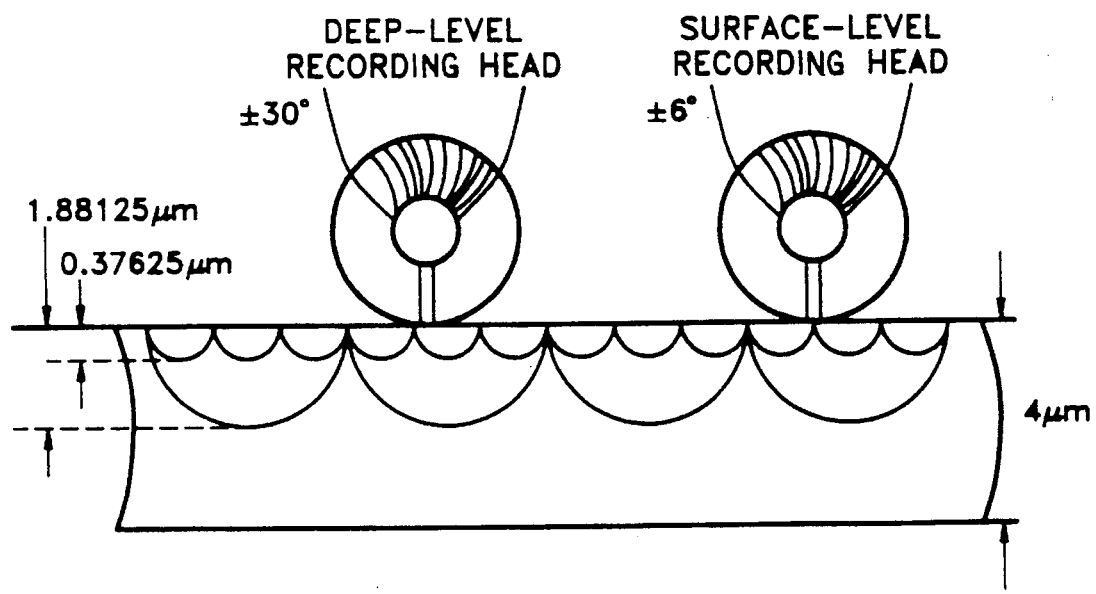
FIG. 6 is a cross-sectional view of a recording medium on which a video signal is recorded by surface-recording heads and deep-recording heads according to the present invention.

As shown in FIG. 6, surface recording and deep recording are performed at different tape depths, using first video head assembly 118 (surface-recording head assembly) and second video head assembly 210 (deep-recording head assembly). The depth can be obtained by the following equations:

$$V = f\lambda$$

$$\lambda_{deep\ level} = V/f$$

$$= \frac{7.525\ m/s}{1\ MHz}$$

$$= 7.525\ \mu m$$

$$\lambda_{surface\ level} = V/f$$

$$= \frac{7.525\ m/s}{5\ MHz}$$

$$= 1.505\ \mu m$$

where $\lambda$ indicates depth; f indicates frequency; and V is the tape's traveling speed.

According to experimental data, since the largest playback output is produced when the recording is carried out at the depth in which the recording current is $\lambda/4$, the depths of the deep signal and surface signal are 1.88125 µm and 0.37625 µm, respectively.

Here, the surface-recording head assembly and deep-recording head assembly are located on a drum. As shown in FIG. 6, the azimuth angle of the surface-recording head is ±6°. The azimuth angle of the deep-recording head is ±30°. First, a deep-level video signal is recorded by second video head assembly 210 and then a surface-level video signal is overlapped on the deep-level video signal on a video track. In the deep-recording head assembly, the gap of a head is wider than that of a head in the surface-recording head assembly, the writing wavelength is long, and magnetization (recording) occurs until the deep level of magnetic substance is reached, due to recording saturation.

As shown in FIG. 7A, the surface recording is performed by forming one frame with four segments by surface-recording heads a, a', b, and b', each head being responsible for recording one segment. The deep recording, as shown in FIG. 7B, is performed in units of fields. Therefore, the data recorded by second video head assembly 210 is deeply recorded in four fields on a track by heads A, A', B and B'.

Figure 8A:
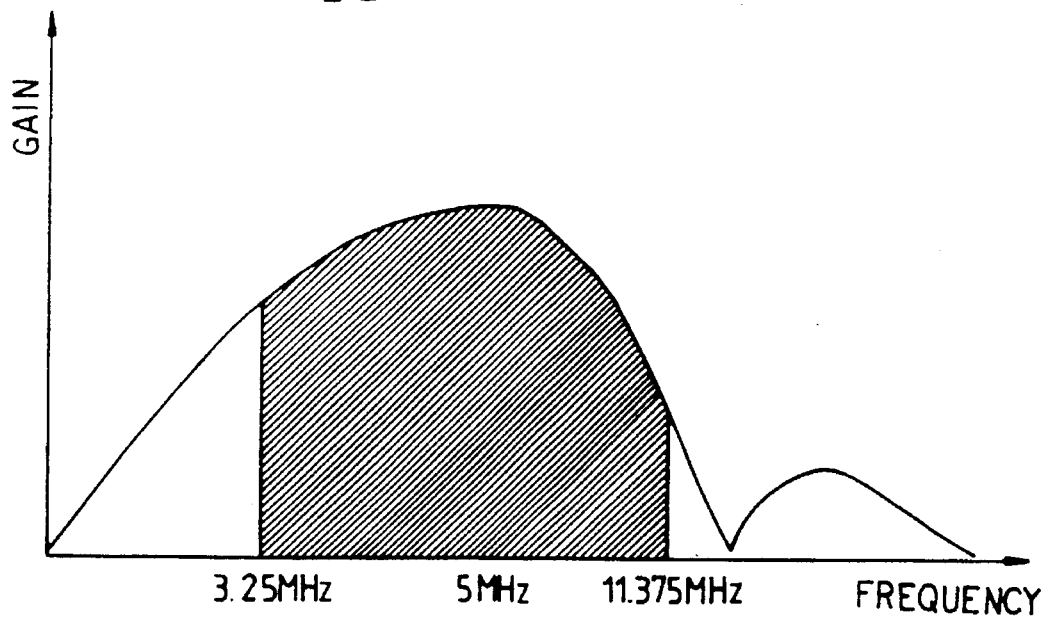
FIG. 8A is a graph showing the frequency spectrum of a normal video signal.

In the frequency spectrum of a normal video signal, as shown in FIG. 8A, 0-about 3 MHz frequency band is empty, and this frequency band is used as the deep-recording band in this invention.

Figure 8B:
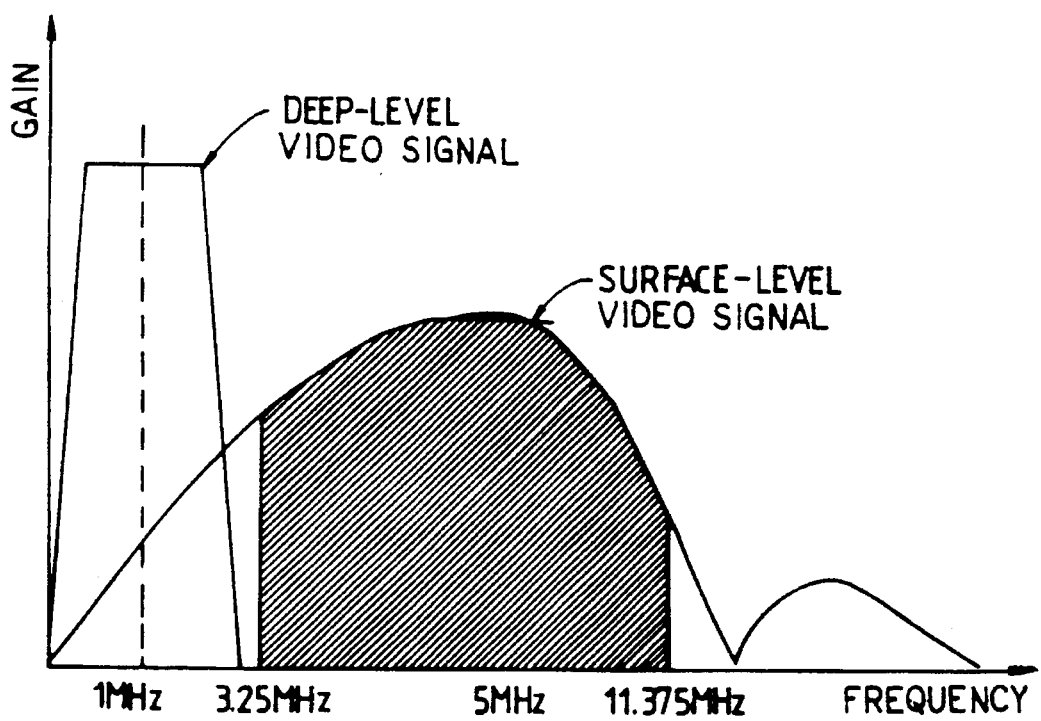
FIG. 8B is a graph showing the frequency spectrum of a deep-recorded video signal.

In order to deeply record data in the empty frequency band as shown in FIG. 8B, the low frequency data should be compressed.

In the first embodiment of this invention, a digital video signal is selected in units of bit planes, in other words, the MSB bit plane is first selected within the maximum recording bit rate and is compressed to reduce the data amount and lower the frequency f. According to $\lambda=1/f$, the wavelength $\lambda$ is elongated so that the data can be deeply recorded on the recording medium. Since lower-order bit data represent high frequency components indicative of edges, when higher-order bit data are deeply recorded, the data can be recorded in the empty low-frequency band as shown in FIG. 8B.

Figure 9B:
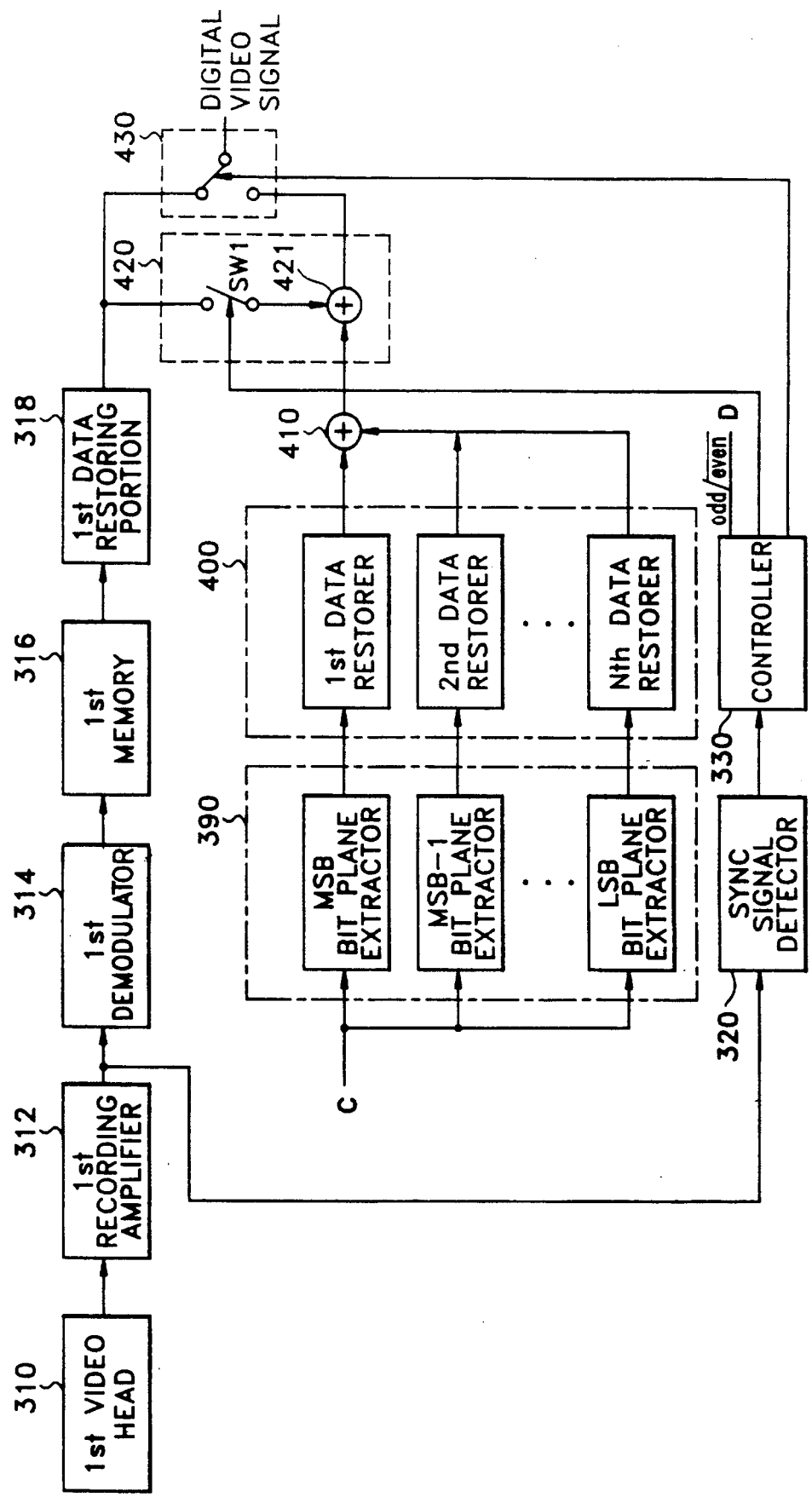

Referring to FIGS. 9A and 9B, the deep reproducing apparatus of a video signal of the present invention has: a first video head assembly 310 for reproducing a digital video signal divided into segments and recorded on the surface level of a recording medium; a first playback amplifier 312 for amplifying the signal reproduced by first video head assembly 310; a first demodulator 314 for demodulating the video signal amplified by first playback amplifier 312; a first memory 316 for temporarily storing the digital video signal demodulated by first demodulator 314; a first data restoration circuit 318 for restoring the digital video signal output from first memory 316; a sync signal detector 320 for detecting a sync signal from the signal reproduced from first playback amplifier 312; a controller 330 for outputting a field control signal D (odd/$\overline{\text{even}}$) according to the sync signal, a switching control signal, and a normal/multifunctional playback mode control signal; a second video head assembly 340 for reproducing a digital video signal deeply recorded in a recording medium in units of fields; a second playback amplifier 350 for amplifying the digital video signal reproduced by second video head assembly 340; a second demodulator 360 for demodulating the digital video signal amplified by second playback amplifier 350; a second memory 370 for temporarily storing odd pixel data and even pixel data of an odd field and odd pixel data and even pixel data of an even field which are demodulated by second demodulator 360; a picture reconstruction circuit 380 composed of a first adder 382 for summing the odd pixel data and even pixel data of the odd fields output from a first odd pixel memory 371 and first even pixel memory 372 of second memory 370, a second adder 384 for summing the odd pixel data and even pixel data of the even fields output from a second odd pixel memory 373 and second even pixel memory 374 of second memory 370, and a first switch 386 for selectively outputting the odd-and even-field digital video signals output from first and second adders 382 and 384 according to the field control signal D (odd/$\overline{\text{even}}$) from controller 330; a bit plane extractor 390 for extracting MSB, MSB-1 . . . , LSB bit planes from the output of first switch 386; a second data restoration circuit 400 for restoring the bit-plane-extracted data from bit plane extractor 390; a third adder 410 for summing the data restored by second data restoration circuit 400 in units of bit planes; a picture-quality enhancer 420 composed of a fourth adder 421 for summing the outputs of first data restoration circuit 318 and third adder 410 during high-speed playback and a control switch SW1 for supplying the output of first data restoration circuit 318 to fourth adder 421 according to a switching control signal output from controller 330 in order to enhance picture quality during high-speed playback; and a second switch 430 for selectively outputting the outputs of first data restoration circuit 318 and fourth adder 421 according to the normal/multifunctional playback mode signal output from controller 330.

Subsequently, the operation of the deep reproducing apparatus of a video signal shown in FIGS. 9A and 9B will be explained below.

First video head assembly 310 reproduces a digital signal divided into segments and recorded on the surface level of a recording medium, as shown in FIG. 7A. First playback amplifier 312 amplifies the signal reproduced by first video head assembly 310. First demodulator 314 fourteen-to-eight bit demodulates the video signal (a signal modulated to fourteen bits during recording) amplified by first playback amplifier 312. First memory 316 temporarily stores the digital video signal demodulated by first demodulator 314 in units of frames.

First data restoration circuit 318 restores the digital video signal output from first memory 316 by data expanding. That is, the compressed digital video signal is expanded to the original digital video signal.

Second video head assembly 340 reproduces the deeply recorded data in units of fields as shown in FIG. 7B. Here, in the digital video signal deeply recorded in the recording medium, the odd field signal and even field signal constituting one frame are recorded using two tracks each when four heads are used. If two heads are used, the odd field signal and even field signal of one frame are both recorded in one track. As mentioned above, second video head assembly 340 reproduces one frame of the digital video signal recorded in four tracks of the recording medium, using four heads A, A', B, and B'.

Second playback amplifier 350, containing individual amplifiers 351–354, amplifies the digital video signal reproduced by second video head 340. Second demodulator 360, containing individual demodulators 361–364, demodulates the amplified and QPSK-modulated signal to the original signal. First odd pixel memory 371 and first even pixel memory 372 and second odd pixel memory 373 and second even pixel memory 374 of second memory 370 temporarily store the odd pixel data and even pixel data and odd pixel data and even pixel data which are demodulated by second demodulator 360.

First adder 382 sums the odd pixel data and even pixel data output from first odd pixel memory 371 and first even pixel memory 372 of second memory 370. Second adder 384 sums the odd pixel data and even pixel data output from second odd pixel memory 373 and second even pixel memory 374 of second memory 370. First switch 386 selectively outputs the odd-field and even-field digital video signals from first and second adders 382 and 384 according to the field control signal D (odd/$\overline{\text{even}}$) from controller 330 which receives the detected sync signal from sync signal detector 320.

First through nth extractors $390_1$–$390_n$ of bit plane extractor 390 extract MSB, MSB-1, LSB bit planes from the output of first switch 386. Therefore, bits on the same level only are extracted in one field or one frame. First through nth restoring circuits $400_1$–$400_n$ of second data restoration circuit 400 restore the bit-plane-extracted data from bit plane extractor 390. The compressed digital video signal is expanded to the original digital video signal in units of bit planes. Third adder 410 sums the data originally restored in first through nth restoring circuits $400_1$–$400_n$ of second data restoration circuit 400 in units of bit planes.

During high-speed playback, since the signal output from third adder 410 is a low-frequency signal, picture quality is deteriorated compared with normal-speed playback. To compensate for this, control switch SW1 is turned on by the switching control signal output from controller 330 so that the output of third adder 410 and the output of first data restoration circuit 318 are summed by fourth adder 421 to be sent to the second selection contact point of second switch 430. Control switch SW1 is turned off so that the output of third adder 410 is fed to the second selection contact point of third switch 430 via fourth adder 421. Second switch 430 outputs only the video signal restored by first data restoration circuit 318 during normal-speed playback and, during high-speed playback, outputs the output of fourth adder 421, that is, a signal in which a video signal reproduced after being deeply recorded and a video signal restored by first data restoration circuit 318 are added. By doing so, a sharp picture is attained.

Figure 10:
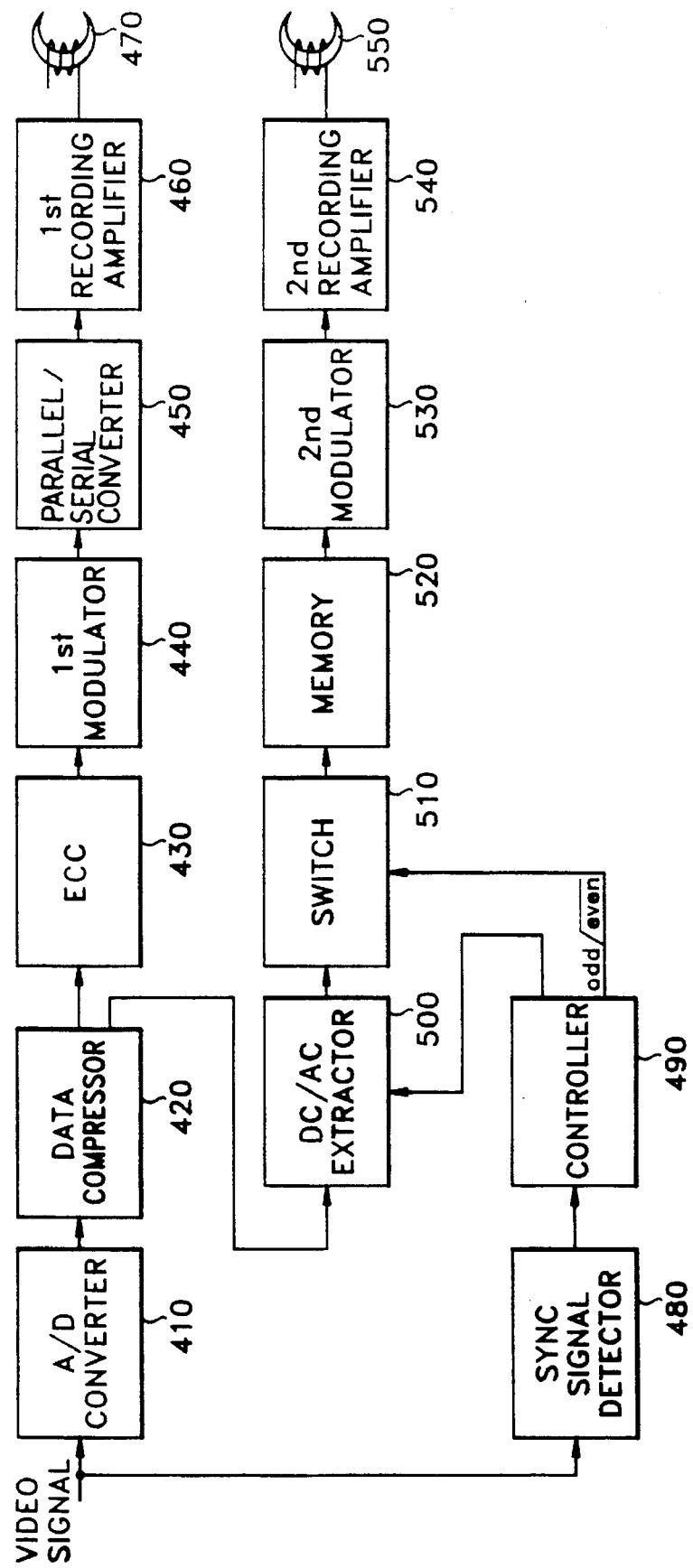
FIG. 10 is a block diagram of another embodiment of the deep recording apparatus of a video signal of the present invention.

Referring to FIG. 10, the deep recording apparatus of another embodiment of the present invention comprises: an A/D converter 410 for converting an input video signal into digital form; a data compressor 420 for compressing digital data; an error-correction coder (ECC) 430 for error-correction-coding the compressed data; a first modulator 440 for modulating the error-correction-coded signal; a parallel-to-serial converter 450 for converting parallel data from first modulator 440 into serial form; a first recording amplifier 460 for amplifying the output of parallel-to-serial converter 450; a first video head 470 for recording the output of first recording amplifier 460 on the surface level of a recording medium; a sync signal detector 480 for detecting a sync signal from an input video signal; a controller 490 for determining the AC/DC extracting amount within the maximum recording bit rate and outputting a field control signal ($\overline{\text{odd/even}}$) according to the sync signal; a AC/DC extractor 500 for extracting a DC component and an AC component from the output of data compressor 420; a switch 510 for switching the output of AC/DC extractor 500 to the odd pixel data and even pixel data of the odd field and odd pixel data and even pixel data of the even field; a memory 520 for storing a signal switched by switch 510; a second modulator 530 for modulating the output of memory 520; a second recording amplifier 540 for amplifying the output of second modulator 530; and a second video head 550 for deeply recording the output of second recording amplifier 540 on the recording medium.

Figure 11:
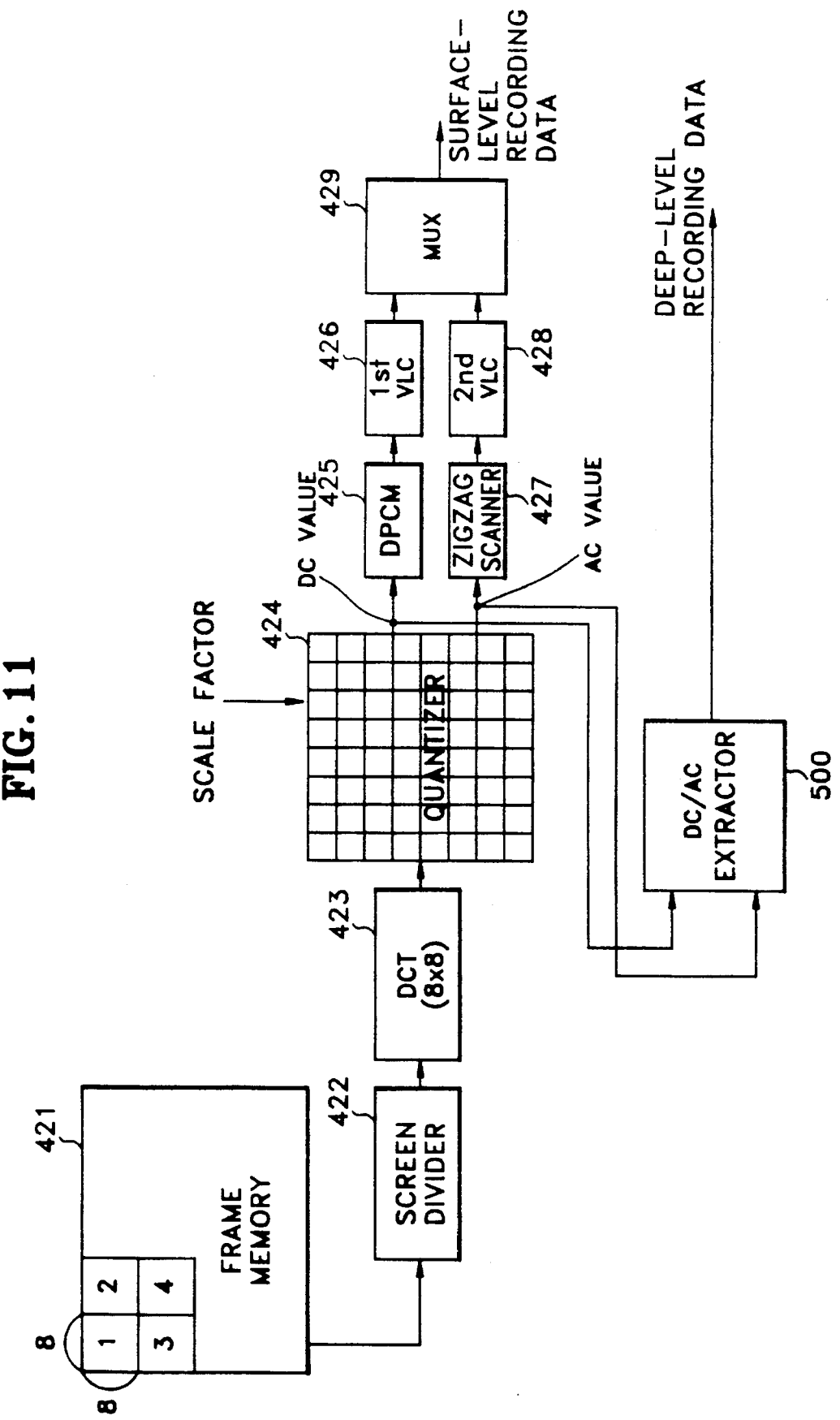
FIG. 11 is a detailed block diagram of the data compression circuit shown in FIG. 10.

The operation of the deep recording apparatus of FIG. 10 will be explained with reference to FIG. 11.

A/D converter 410 converts an input analog video signal into digital form. Since the amount of information increases greatly due to the conversion, in order to video-record on a shorter length of tape and deeply record information required during high-speed playback, data compression in data compressor 420 using the aforementioned MPEG-proposed DCT and VLC methods, becomes essential.

Data compressor 420 will be described with reference to FIG. 11. In FIG. 11, frame memory 421 stores the data output from A/D converter 410 in units of frames. Screen divider 422 divides the data output from frame memory 421 into 8×8-pixel block units. DCT 423 then performs a DCT operation on the divided 8×8 blocks.

The DCT operation is an effective method for concentrating energy scattered throughout the pixels of a source image onto some low-frequency transform coefficients (including a DC component). This is based upon the fact that a video signal has a large correlation in the spatial direction. FDCT (forward DCT) and IDCT (inverse DCT) values can be obtained using the following equations:

$$F(u,v) = 1/4 C(u)C(v) \sum_{i=0}^{7} \sum_{j=0}^{7} f(i,j) \cos\frac{(2i+1)u\pi}{16} \cos\frac{(2j+1)u\pi}{16}$$

$$f(i,j) = 1/4 \sum_{i=0}^{7} \sum_{j=0}^{7} C(u)C(v)F(u,v) \cos\frac{(2i+1)u\pi}{16} \cos\frac{(2j+1)u\pi}{16}$$

where $C(u)C(v)$ equals one half for $u,v=0$ and equals one for $u,v \neq 0$; $f(i,j)$ is the input picture from −128 to 127; $F(u,v)$ is the DCT coefficient from −1024 to 1024; $F(0,0)$ is the DC coefficient; and $F(u,v)$ is the AC coefficient for $u,v \neq 0$.

Quantizer 424 quantizes a quantization matrix in a psycho visual experiment which combines the characteristics of the human eye and DCT coefficients.

When the DC coefficients output from quantizer 424 are modulated by a differential pulse code modulation (DPCM) circuit 425, a data compression effect is obtained. In other words, the data compression effect is obtained when the DC coefficients of the present block use those of the preceding block as a predictor because the DC coefficients have a relationship with the average value of each block.

The AC coefficients output from quantizer 424 are sequentially coded. A DCT code is one which is calculated by dividing a source image into blocks. Here, the correlation between the average values of blocks is relatively high.

Specifically, it is probable that the low-frequency AC coefficients contain non-zero values and the high-frequency coefficients thereof contain zero values. Therefore, before entropy coding the DCT coefficients, the coding efficiency is enhanced if many (as many as possible) zeros occur sequentially. This process can be carried out by appropriately arranging the scanning order of the DCT transform coefficient matrix, so that the output of quantizer 424 is arranged in zigzag form by zigzag scanner 427.

First VLC 426 variable-length-codes the DC coefficients output from DPCM 425, and second VLC 428 variable-length-codes the AC coefficients output from zigzag scanner 427. The variable-length-coded coefficients are output via multiplexer 429 as data for surface-level recording.

Technology related to the data compression is disclosed in the following documents: "Digital Coding of HDTV based on Discrete Cosine Transform" (by M. Barbero, ITU, COM-90, 1990); "Preliminary Text for MPEG Video Coding Standards" (ISO-IEC JTC1/SC2/WG11, 1990); National Technical Report, Vol.30, No.1, February 1984; IEEE Transaction on Consumer Electronics, Vol. CE-30, No.3, August 1984; ITEJ Technical Report, Vol. 15, No.50, September 1991.

ECC circuit 430 (FIG. 10) error-correction-codes the compressed data from data compressor 420. Such ECC technology is disclosed in U.S. Pat. No. 5,142,537. First modulator 440 modulates the error-corrected eight-bit data into fourteen bit form. The data is then converted into serial form via parallel-to-serial converter 450. First recording amplifier 460 amplifies the serially output data, which is then divided into segments and recorded on the surface level of the recording medium.

Meanwhile, sync signal detector 480 detects a sync signal contained in an input video signal and outputs the sync signal to controller 490. Controller 490 outputs a control signal for selecting the DC or AC component within the maximum recording bit rate and outputs the field control signal according to the detected sync signal. DC/AC extractor 500 extracts the DC component and AC component of the compressed signal output from data compressor 420 according to the control signal output from controller 490.

For instance, if only the DC component output from quantizer 424 of data compressor 420 is extracted and recorded on the deep level of the recording medium, DC/AC extractor 500 extracts and stores the DC component of each block in one frame. Here, the storage speed slows the data processing speed by 64 times so that all of the pixels of a block have a DC value.

Switch 510, memory 520, second modulator 530, second recording amplifier 540 and second video head assembly 550 have the same construction and operation as those of FIG. 4B (elements 170, 180, 190, 200, and 210, respectively). Also, the surface-level-recording and deep-level-recording operations of first and second video head assemblies 470 and 550 have been described with respect to FIGS. 5, 6, 7A, 7B, 8A and 8B.

Figure 12:
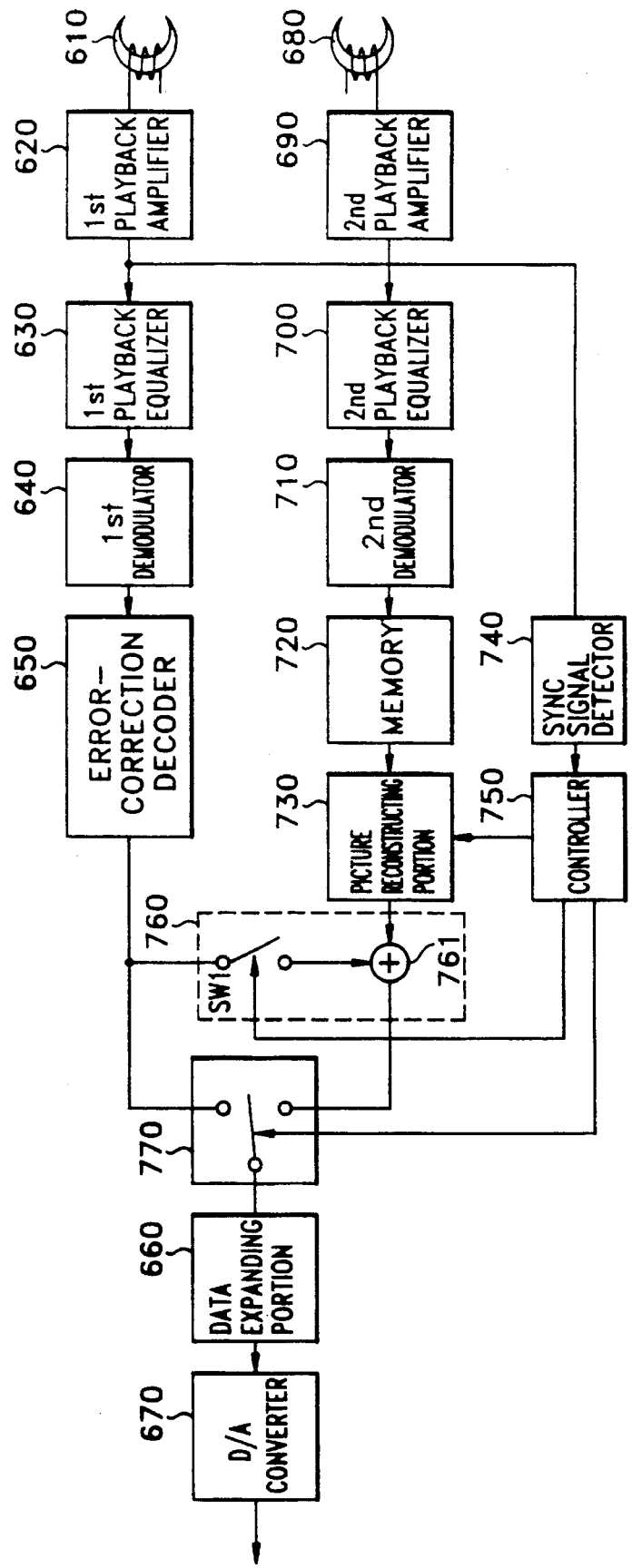
FIG. 12 is a block diagram of another embodiment of the deep reproducing apparatus of a video signal of the present invention.

Referring to FIG. 12, the deep reproducing apparatus of another embodiment of the present invention has: a first video head assembly 610 for reproducing the data recorded on the surface level of a recording medium; a first playback amplifier 620 for reproducing and amplifying the signal reproduced from first video head assembly 610; a first reproducing equalizer 630 for equalizing the output of first playback amplifier 620; a first demodulator 640 for demodulating the output of first playback equalizer 630; an error-correction decoder 650 for error-correction-decoding the output of first demodulator 640; a data expander 660 for data-expanding the output of error-correction decoder 650; a D/A converter 670 for converting the output of data expander 660 into analog form; a second video head assembly 680 for reproducing the data recorded on the deep-level of the recording medium; a second playback amplifier 690 for amplifying the signal reproduced from second video head assembly 680; a second reproducing equalizer 700 for equalizing the output of second playback amplifier 690; a second demodulator 710 for demodulating the output of second reproducing equalizer 700; a memory 720 for storing the odd pixel data and even pixel data of odd field and the odd pixel data and even pixel data of even field which are output from second demodulator 710; a picture reconstruction circuit 730 for reconstructing the output of memory 720 into a picture in one frame; a sync signal detector 740 for detecting a sync signal from the signal reproduced from first playback amplifier 620; a controller 750 for outputting a field control signal (odd/$\overline{\text{even}}$) according to the detected sync signal, outputting a mode control signal by recognizing normal playback mode or multifunctional playback mode, and outputting a switching control signal; a picture-quality enhancer 760 composed of an adder 761 for adding the output of error-correction decoder 650 and the output of second demodulator 710 and a control switch SW1 for transmitting or blocking the output of error-correction decoder 650 according to the switching control signal of controller 750 during high-speed playback; and a selector 770 for selecting the output of adder 761 or the output of error-correction decoder 650.

Next, the operation of the deep reproducing apparatus of FIG. 12 will be described below.

As shown in FIG. 7A, first video head assembly 610 reproduces the data recorded on the surface level. The reproduced data is amplified by first playback amplifier 620 and equalized by first reproducing equalizer 630.

First demodulator 640 has the same operation as the corresponding elements of FIG. 9A. Error-correction decoder 650 is provided for error-correction-decoding the output of first demodulator 640.

Data expander 660 expands the data compressed during recording in the reverse order thereof and D/A converter 670 converts and outputs the expanded data into an analog signal.

As shown in FIG. 7B, second video head assembly 680 reproduces the data recorded on the deep level. The reproduced data is amplified by second playback amplifier 690 and equalized by second reproducing equalizer 700. Second demodulator 710 demodulates the QPSK-modulated output of second reproducing equalizer 700.

Memory 720 stores the odd pixel data and even pixel data of odd field and odd pixel data and even pixel data of even field, which are demodulated by second demodulator 710. Picture reconstruction circuit 730 reconstructs the output of memory 720 in a picture of one frame.

Here, second video head assembly 680, second playback amplifier 710, memory 720 and picture reconstruction circuit 730 have the same construction and operation as those of FIG. 9A (elements 340, 350, 360, 370 and 380, respectively).

During normal-speed playback, data recorded on the surface level is reproduced, and during high-speed playback, data recorded on the deep level is reproduced. Here, having great correlation between fields, the deeply recorded data is easily reconstructed and produces satisfactory picture quality. In order to further improve picture quality, the surface-level-recorded information is also utilized.

Specifically, during high-speed playback, since the signal output from picture reconstruction circuit 730 is a low frequency signal, picture quality becomes worse than during normal-speed playback. To compensate for this, the switching signal output from controller 750 is switched, to sum the outputs of picture reconstruction circuit 730 and error-correction decoder 650.

During normal-speed playback, only the video signal restored by error-correction decoder 650 is output and during high-speed playback, the output of adder 761, that is, the signal in which a deeply recorded and reproduced video signal and the video signal restored by error-correction decoder 650 are added, is output, so as to obtain a sharp picture.

As described above, in the video signal recording format and deep recording/reproducing apparatus and method therefor according the present invention, a digital video signal is divided into segments and recorded on the surface level of a recording medium, and simultaneously, data is compressed and recorded on the deep level of the recording medium in units of fields on tracks. During multifunctional playback, a picture can be obtained using the deeply recorded data.

In the present invention, in order to solve the high-speed playback problem of a digital VCR, data of a format similar to the analog VCR format having great correlation between fields, for high-speed playback, is deeply recorded and reproduced. This avoids the overhead of data on the surface level of a recording medium and the complexity of an algorithm. Furthermore, this allows the use of surface information during high-speed playback, as well as the deep level information, thereby providing improved picture quality.

Though this invention has been described according to the specific embodiments, they do not confine the invention and various modifications are within the spirit and scope of the invention. In particular, specific circuitry was presented in the description but various other means can be provided by persons having ordinary skill in the art.

What is claimed is:

1. A deep recording/reproducing apparatus of a video signal comprising:

a recording system in which an input digital video signal of one frame is divided into a predetermined number of segments and recorded in a corresponding predetermined number of tracks on a surface level of a recording medium, and an undivided digital video signal of one frame is recorded on a deep level of the recording medium in said predetermined number of tracks; and a reproducing system in which said digital video signal recorded on the recording medium by said recording system is reproduced, with the surface-level-recorded data being reproduced during normal speed playback and with the deep-level-recorded data being reproduced during multifunctional playback.

2. A deep recording/reproducing apparatus of a video signal as claimed in claim 1, wherein said recording system comprises:

a first memory for storing an input digital video signal in units of frames;

first data compressing means for compressing the output from said first memory;

first modulating means for modulating the output from said first data compressing means;

first video head assembly for recording the output from said first modulating means on the surface level of the recording medium;

first bit plane extracting means for extracting the output from said first memory in units of bit planes;

second data compressing means for compressing the data extracted from said first bit plane extracting means;

sync signal detecting means for detecting a sync signal from said input digital video signal;

controlling means for calculating the bit rate of the data compressed by said second data compressing means so as to output a selection control signal for selecting a bit plane within the maximum recording bit rate for recording data on the recording medium, and determining whether the present field is odd or even according to the sync signal detected from said sync signal detecting means so as to output a switching signal;

bit rate controlling means for selecting the data output from said second data compressing means according to said selection control signal output from said control means within the maximum recording bit rate, and adding the selected data;

first switching means for outputting the output of said bit rate controlling means by classifying the output of said bit rate controlling means into odd pixel data and even pixel data of an odd field and odd pixel data and even pixel data of an even field so as to divide the output into the predetermined number of tracks according to the switching signal output from said controlling means;

second memory for temporarily storing the data output from said first switching means; and a second video head assembly for deeply recording the signal output from said second memory on the recording medium.

3. A deep recording/reproducing apparatus of a video signal as claimed in claim 2, wherein said second video head assembly is composed of a head for recording the odd pixel data of an odd field, a head for recording the even pixel data of an odd field, a head for recording the odd pixel data of an even field, and a head for recording the even pixel data of an even field.

4. A deep recording/reproducing apparatus of a video signal as claimed in claim 2, wherein said second video head assembly is composed of a head for recording the data of an odd field, and a head for recording the data of an even field.

5. A deep recording/reproducing apparatus of a video signal as claimed in claim 2, wherein said second video head assembly records the output of said second memory on an empty low-frequency band of a video signal.

6. A deep recording/reproducing apparatus of a video signal as claimed in claim 2, wherein said reproducing system comprises:

a first video head assembly for reproducing the digital video signal recorded on the surface level of the recording medium;

first demodulating means for demodulating the video signal output from said first video head;

a third memory for temporarily storing the digital video signal demodulated by said first demodulating means;

first data restoring means for restoring the digital video signal output from said third memory;

sync signal detecting means for detecting a sync signal from the signal reproduced from said first video head;

controlling means for outputting a field control signal according to said sync signal, and outputting a switching control signal and a normal/multifunctional playback mode control signal;

a second video head assembly for reproducing the digital video signal deeply recorded on the recording medium;

second demodulating means for demodulating the digital video signal reproduced by said second video head assembly;

a fourth memory for temporarily storing the odd pixel data and even pixel data of an odd field and the odd pixel data and even pixel data of an even field which are demodulated by said second demodulating means;

picture reconstructing means for selectively summing an odd-field digital video signal or an even-field digital video signal, output from said fourth memory, according to the switching control signal output from said controlling means, so as to reconstruct one frame;

second bit plane extracting means for extracting the output of said second switching means in units of bit planes;

second data restoring means for restoring the original signal from said second bit plane extracting means in units of bit planes; and selecting means for selecting the output of said first data restoring means during normal-speed playback, and selecting the output of said second data restoring means during high-speed playback.

7. A deep recording/reproducing apparatus of a video signal as claimed in claim 6, further comprising picture-quality enhancement means composed of:

an adder for summing the outputs of said first data restoring means and said second data restoring means, and sending the result to said selecting means so as to enhance picture quality during high-speed playback; and a control switch for transmitting or blocking the output of said first data restoring means according to the control signal of said controlling means during high-speed playback.

8. A deep recording/reproducing apparatus of a video signal as claimed in claim 6, wherein said second video head assembly is composed of a head for recording the odd pixel data of an odd field, a head for recording the even pixel data of an odd field, a head for recording the odd pixel data of an even field, and a head for recording the even pixel data of an even field.

9. A deep recording/reproducing apparatus of a video signal as claimed in claim 6, wherein said second video head assembly is composed of a head for recording the data of an odd field, and a head for recording the data of an even field.

10. A deep recording/reproducing apparatus of a video signal as claimed in claim 1, wherein said recording system comprises:

data compressing means for data-compressing said input digital video signal;

error-correction coding means for error-correction-coding the compressed data;

first modulating means for modulating the error-correction-coded signal;

first video head assembly for recording the output of said first modulating means on the surface level of the recording medium;

sync signal detecting means for detecting a sync signal from said input digital video signal;

controlling means for determining a DC/AC extracting amount within the maximum recording bit rate and whether the present field is odd or even according to the sync signal, so as to output a switching signal;

DC/AC extracting means for extracting the DC and AC components from the output of said data compressing means within the maximum recording bit rate under the control of said controlling means;

switching means for outputting the output of said AC/DC extracting means by dividing odd pixels and even pixels of an odd field and odd pixels and even pixels of an even field according to said switching signal output from said controlling means;

a memory for temporarily storing the data output from said switching means;

second modulating means for modulating the output of said memory; and a second video head assembly for deeply recording the output of said second modulating means on the recording medium.

11. A deep recording/reproducing apparatus of a video signal as claimed in claim 10, wherein said second video head assembly is composed of a head for recording odd pixel data of an odd field, a head for recording even pixel data of an odd field, a head for recording odd pixel data of an even field, and a head for recording even pixel data of an even field.

12. A deep recording/reproducing apparatus of a video signal as claimed in claim 10, wherein said second video head assembly is composed of a head for recording the data of an odd field, and a head for recording the data of an even field.

13. A deep recording/reproducing apparatus of a video signal as claimed in claim 10, wherein said second video head assembly records the output of said second modulating means on an empty low-frequency band of a video signal.

14. A deep recording/reproducing apparatus of a video signal as claimed in claim 10, wherein said reproducing system comprises:

a first video head assembly for reproducing the data recorded on the surface level of the recording medium;

first demodulating means for demodulating the signal reproduced from said first video head assembly;

error-correction decoding means for error-correction-decoding the output of said first demodulating means;

data expanding means for data-expanding the output of said error-correction coding means;

a second video head assembly for reproducing the data recorded on the deep level of the recording medium;

sync signal detecting means for detecting a sync signal from the signal reproduced from said first video head assembly;

controlling means for outputting a field control signal according to the detected sync signal, outputting a mode control signal by recognizing a normal playback or multifunctional playback mode, and outputting a switching control signal;

second demodulating means for demodulating the signal reproduced from said second video head assembly;

a memory for storing odd pixel data and even pixel data of an odd field and odd pixel data and even pixel data of an even field which are output from said second demodulating means;

picture reconstructing means for reconstructing the output of said memory into one frame according to the switching control signal; and selecting means for selecting the output of said error-correction decoding means during normal-speed playback, and selecting the output of said picture reconstructing means during high-speed playback, and providing the selected output to said data expanding means.

15. A deep recording/reproducing apparatus of a video signal as claimed in claim 14, further comprising picture-quality enhancement means composed of:

an adder for summing the outputs of said error-correction decoding means and said picture reconstructing means, and sending the result to said selecting means so as to enhance picture quality during high-speed playback; and a control switch for transmitting or blocking the output of said error-correction decoding means according to the control signal of said controlling means during high-speed playback.

16. A deep recording/reproducing apparatus of a video signal as claimed in claim 14, wherein said second video head assembly head is composed of a head for recording the odd pixel data of an odd field, a head for recording the even pixel data of an odd field, a head for recording the odd pixel data of an even field, and a head for recording the even pixel data of an even field.

17. A deep recording/reproducing apparatus of a video signal as claimed in claim 14, wherein said second video head assembly is composed of a head for recording the data of an odd field, and a head for recording the data of an even field.

18. A deep recording/reproducing apparatus in which an input digital video signal of one frame is divided into a predetermined number of segments and recorded on the surface level of a recording medium using a corresponding number of tracks, and an undivided digital video signal of one frame is recorded on the deep level of the recording medium in the predetermined number of tracks, said apparatus comprising:

a first video head for reproducing the video signal recorded on the surface level of the recording medium;

first data restoring means for restoring the data reproduced by said first video head;

a second video head for reproducing the video signal recorded on the deep level of the recording medium;

bit plane extracting means for extracting the signal reproduced by said second video head in units of bit planes;

second data restoring means for restoring the output of said bit plane extracting means; and selecting means for selecting the output of said first data restoring means during normal-speed playback, and selecting the output of said second data restoring means during high-speed playback.

19. The apparatus as claimed in claim 18, further comprising picture-quality enhancement means for summing the outputs of said first data restoring means and said second data restoring means, and transmitting the result to said selecting means, so as to enhance picture quality during high-speed playback.

20. A deep recording/reproducing apparatus in which an input digital video signal of one frame is divided into a predetermined number of segments and recorded on a surface level of a recording medium using a corresponding number of tracks, and an undivided digital video signal of one frame is recorded on a deep level of the recording medium in the predetermined number of tracks, said apparatus comprising:

first playback controlling means for reproducing the signal recorded on the surface level of the recording medium using a first video head, so as to regain said input digital video signal;

second controlling means for reproducing the signal recorded on the deep level of the recording medium using a second video head, so as to regain said input digital video signal; and selecting means for selecting an output of said first playback controlling means during normal-speed playback, and selecting an output of said second playback controlling means during high-speed playback.

21. The apparatus as claimed in claim 20, further comprising picture-quality enhancement means for summing the outputs of said first playback controlling means and said second playback controlling means, and sending the result to said selecting means, so as to improve picture quality during high-speed playback.

22. A deep recording/reproducing method comprising the steps of:

dividing one frame of an input digital video signal into a predetermined number of segments so as to record the divided signal on a surface level of a recording medium using a corresponding predetermined number of tracks, and recording one frame of an undivided digital video signal in the predetermined number of tracks on a deep level of the recording medium; and reproducing the digital video signal recorded on the recording medium during said recording step, with the surface-level-recorded data being reproduced during normal playback and with the deeply recorded data being reproduced during multifunctional playback.

\* \* \* \* \*